United States Patent
Huang et al.

(10) Patent No.: US 7,120,201 B2
(45) Date of Patent: Oct. 10, 2006

(54) METHOD AND SYSTEM FOR OPTIMIZATION OF CHANNEL ESTIMATION AND SYNCHRONIZATION IN AN OFDM-MIMO WIRELESS COMMUNICATION SYSTEM

(75) Inventors: Yuejin Huang, Holbrook, NY (US); Robert Lind Olesen, Huntington, NY (US); Chang-Soo Koo, Melville, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/222,171

(22) Filed: Sep. 8, 2005

(65) Prior Publication Data

US 2006/0056529 A1 Mar. 16, 2006

Related U.S. Application Data

(60) Provisional application No. 60/608,646, filed on Sep. 10, 2004.

(51) Int. Cl.
*H04B 7/02* (2006.01)
*H04L 1/02* (2006.01)
(52) U.S. Cl. ..................... 375/267; 375/299
(58) Field of Classification Search ............... 375/229, 375/231, 259, 260, 267, 299
See application file for complete search history.

(56) References Cited

U.S. PATENT DOCUMENTS

| | | | |
|---|---|---|---|
| 2003/0218973 A1* | 11/2003 | Oprea et al. ................. | 370/210 |
| 2004/0066802 A1* | 4/2004 | Ro et al. ..................... | 370/528 |
| 2004/0142665 A1* | 7/2004 | Papathanasion et al. .... | 455/101 |
| 2005/0105505 A1* | 5/2005 | Fishler et al. ............... | 370/349 |

* cited by examiner

*Primary Examiner*—Jay K. Patel
*Assistant Examiner*—David B. Lugo
(74) *Attorney, Agent, or Firm*—Volpe and Koenig, P.C.

(57) ABSTRACT

The present invention is related to a method and system for optimization of channel estimation and synchronization in an Orthogonal Frequency Division Multiplexing (OFDM) Multiple-Input Multiple-Output (MIMO) wireless communication system. In accordance with the present invention, all of the training sequences are simply constructed based on a basic code by cyclically shifting the basic code. The training sequences are transmitted from different antennas in parallel without performing inverse fast Fourier transform. As a result, there is no peak-to-average ratio problem. Channel estimation is performed in each receiver based on the samples before fast Fourier transform and the maximum-likelihood estimate of channel response in time domain is then mapped into the frequency domain. The channel estimation is not only very simple in implementation, but also very efficient in computation.

22 Claims, 2 Drawing Sheets

ND SYSTEM FOR
METHOD AND SYSTEM FOR OPTIMIZATION OF CHANNEL ESTIMATION AND SYNCHRONIZATION IN AN OFDM-MIMO WIRELESS COMMUNICATION SYSTEM

CROSS REFERENCE TO RELATED APPLICATION

This application claims the benefit of U.S. provisional application No. 60/608,646 filed Sep. 10, 2004, which is incorporated by reference as if fully set forth.

FIELD OF INVENTION

The present invention relates to wireless communications. More particularly, the present invention relates to a method and system for optimization of channel estimation and synchronization in an Orthogonal Frequency Division Multiplexing (OFDM) Multiple-Input Multiple-Output (MIMO) wireless communication system.

BACKGROUND

OFDM is a data transmission scheme where the data is split into smaller streams and each stream is transmitted using a sub-carrier with a smaller bandwidth than the total available transmission bandwidth. The efficiency of OFDM is a result of the fact that the sub-carriers are selected so that they are orthogonal to each other. In other words, the sub-carriers do not interfere with each other while each is carrying a portion of the total user data.

There are practical reasons why OFDM may be preferred over other transmission schemes such as Code Division Multiple Access (CDMA). When the user data is split into streams carried by different sub-carriers, the effective data rate on each sub-carrier is less than the total data rate. Therefore, the symbol duration is much larger. Large symbol duration can tolerate larger delay spreads. In other words, data that is transmitted with a large symbol duration is not affected by multipath as severely as symbols with a shorter duration. OFDM symbols can tolerate delay spreads that are typical in wireless communications and do not require complicated receiver designs to recover from multipath delay.

MIMO is a wireless transmission and reception scheme where both the transmitter and receiver employ more than one antenna for transmission and reception. A MIMO system takes advantage of the spatial diversity or spatial multiplexing options created by the presence of multiple antennas and improves signal-to-noise ratio (SNR) and increases throughput.

In OFDM-MIMO systems, training sequence design as well as efficient channel estimation algorithm remains a challenge if different training sequence signals are transmitted from different antennas simultaneously. Several approaches based on training tones have been attempted in prior art systems. As a result, the channel estimation has to be done in the frequency domain, resulting in increased complexity and degraded performance. Other known solutions of a time orthogonal pre-amble scheme can be implemented, but this is at the expense of increased overhead.

SUMMARY

The present invention is related to a method and system for optimization of channel estimation and synchronization in an OFDM-MIMO wireless communication system. The present invention provides a method for generating training sequences, performing channel estimation and performing synchronizations of timing and frequency. All of the training sequences are simply constructed based on a basic code, and the training sequences are transmitted from different antennas in parallel without doing inverse fast Fourier transform (IFFT). As a result, there is no peak-to-average ratio problem for the training sequences. The channel estimation is performed in each receiver based on the samples before fast Fourier transform (FFT) and the maximum-likelihood estimate of channel response in time domain is then mapped into the frequency domain. Because of the maximum-likelihood estimation, the channel estimation is optimum, very simple in implementation and efficient in computation. With a loose constraint on the basic code, the synchronization is also optimum with respect to maximized SNR.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Figure 1:
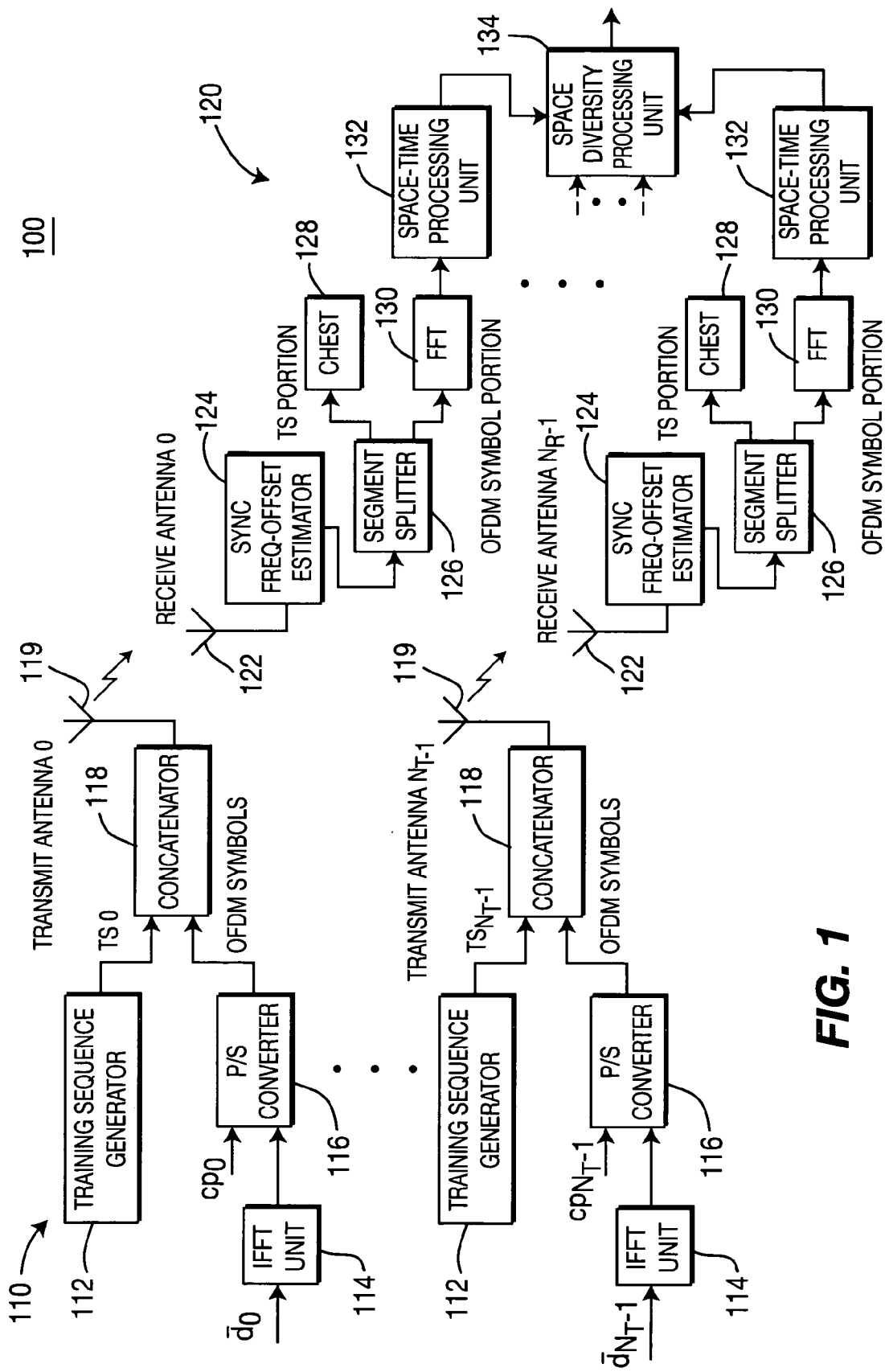
FIG. 1 is a block diagram of an OFDM-MIMO system in accordance with the present invention.

The present invention will be described with reference to the drawing figures wherein like numerals represent like elements throughout.

The features of the present invention may be incorporated into an integrated circuit (IC) or be configured in a circuit comprising a multitude of interconnecting components.

The present invention is for use in an OFDM-MIMO system with $N_T$-transmit antennas and $N_R$-receive antennas. Referring to FIG. 1, a block diagram of an OFDM-MIMO system 100 comprising a transmitter 110 and a receiver 120 is shown. The transmitter 110 comprises a plurality of training sequence (TS) generators 112, a plurality of IFFT units 114, a plurality of parallel-to-serial (P/S) converters 116, a plurality of concatenators 118 and a plurality of transmit antennas 119. The receiver 120 comprises a plurality of receive antennas 122, a plurality of frequency offset estimators 124, a plurality of segment splitters 126, a plurality of channel estimators 128, a plurality of FFT units 130, a plurality of space-time processing units 132 and a space diversity processing unit 134.

For each of the $N_T$ transmit antennas 0 to $N_T-1$ 119, the IFFT unit 114 converts input data into time domain signals and the P/S converters 116 insert a cyclic prefix into the data streams. The TS generator 112 directly generates a time-domain TS without performing IFFT. The concatenator 118 attaches the time-domain TS to the OFDM symbols. The OFDM symbols with the attached TS are sent to the transmit antenna 119 for transmission. Different TS signals are transmitted from different antennas in parallel. Since the TS is generated without performing IFFT, it consists of elements of 1 and −1. As a result, there is no peak-to-average ratio problem for the TS portion of the transmitted signal.

For each of the $N_R$ receive antennas 0 to $N_R-1$ 122, the transmitted signals are received by the receive antennas 122. The synchronization and frequency offset estimator 124 may be utilized for estimation of carrier frequency offset and system timing, which will be explained in detail hereinafter. The TS portion and the OFDM symbol portion are separated by the segment splitter 126. The TS portion is sent to the channel estimator 128 directly without performing FFT. The OFDM symbol portion is sent to the FFT unit 130. The channel estimator 128 generates a channel estimation, which is forwarded to the space-time processing unit 132. The space-time processing unit 132 processes the OFDM symbols based on the channel estimation from the channel estimator 128. The space diversity processing unit 134 processes the outputs from the space-time processing unit 132.

One embodiment of generation of the TS in accordance with the present invention is explained hereinafter. A basic code of length N is determined, which is expressed as follows:

$$M_0 = \{m_0, m_1, m_2, \ldots, m_{N-2}, m_{N-1}\}. \qquad \text{Equation (1)}$$

It is assumed that $M_0$ is an arbitrary sequence (waveform) of length N at the beginning. The conditions that optimize the selection of the basic code are explained hereinafter.

$M_j$ is then defined as a cyclic j-shift version of $M_0$. For example, $M_1$ is defined as follows:

$$M_1 = \{m_{N-1}, m_0, m_1, \ldots, m_{N-3}, m_{N-2}\}. \qquad \text{Equation (2)}$$

$N_T$ represents the number of transmit antennas. W is defined as follows:

$$W = \left\lfloor \frac{N}{N_T} \right\rfloor; \qquad \text{Equation (3)}$$

where $\lfloor x \rfloor$ is the largest integer smaller or equal to x. The system parameters N and $N_T$ are chosen properly so that the condition L<W is satisfied, where L represents the maximum delay spread. Therefore, it can be assumed that L=W−1.

From the basic code $M_0$, another $N_T-1$ codes, ($M_W, \ldots, M_{(N_T-1)W}$), can be obtained. The code $M_{kW}$ is represented as follows:

$$M_{kW} = \{m_{N-kW}, m_{N-kW+1}, \ldots, m_{N-2}, m_{N-1}, m_0, m_1, \ldots, m_{N-kW-2}, m_{N-kW-1}\}; \qquad \text{Equation (4)}$$

where $k \in [0, 1, 2, \ldots, N_T-1]$.

A cyclic prefix code $P_{kW}$ is defined for the code $M_{kW}$ as follows:

$$P_{kW} = \{m_{N-kW-W}, m_{N-k-(W-1)}, m_{N-kW-2}, m_{N-kW-1}\}. \qquad \text{Equation (5)}$$

$P_{kW}$ is a repeat of the last W elements of the code $M_{kW}$. Concatenating the codes $P_{kW}$ and $M_{kW}$ for each value of k, $N_T$ training sequences of length N+W are obtained. They are expressed as follows:

$$T_{kW}(0) = \{P_{kW}, M_{kW}\}. \qquad \text{Equation (6)}$$

According to Equations (4) and (5), $T_{kW}(0)$ of Equation (6) can be expressed as follows:

$$T_{kW}(0) = \left\{ \begin{array}{l} \overline{\underbrace{m_{N-kW-W}, m_{N-kW-(W-1)}, \ldots, m_{N-kW-2}, m_{N-kW-1}}_{P_{kW}}}, \\ \underbrace{m_{N-kW}, m_{N-kW+1}, \ldots, m_{N-2}, m_{N-1}, m_0, m_1, \ldots, m_{N-kW-2}, m_{N-kW-1}}_{M_{kW}} \end{array} \right\}. \qquad \text{Equation (7)}$$

Suppose $T_{kW}(0)$ is used by the kth transmit antenna without loss of generality. In MIMO systems, all of the training sequences are transmitted from different antennas in parallel.

At the receiver, a window of length N is used to take a desired portion of the received signal for channel estimation. To understand which portion of the received signal should be used, a linear l-element delayed version of $T_{kW}(0)$ is defined as follows:

$$T_{kW}(l) = \left\{ \begin{array}{l} \underbrace{\overline{x, x, \ldots, x}}_{\substack{l \text{ elements of} \\ \text{any values}}}, m_{N-kW-W}, m_{N-kW-(W-1)}, \ldots, m_{N-kW-2-l}, m_{N-kW-1-l}, \\ m_{N-kW-l}, m_{N-kW-(l+1)}, \ldots, m_{N-2}, m_{N-1}, m_0, m_1, \ldots, m_{N-kW-2-l}, m_{N-kW-1-l} \end{array} \right\}. \qquad \text{Equation (8)}$$

$T_{kW}(l)$ is obtained by linearly shifting right $T_{kW}(0)$ by l elements, (i.e., dropping the last l elements and shifting-in the first l elements of any values). Typically, there is other data on both sides of each training sequence. The dropped last l elements are overlapped with the data following the training sequence. The shifted-in first l elements are the data before the training sequence. Because $T_{kW}(0)$ is of length W+N, it is impossible that the last N-element portion of $T_{kW}(l)$ includes any undesired data provided that $0 \leq l < W$. Therefore, the present invention only uses the last N elements of $T_{kW}(l)$, denoted by $\hat{T}_{kW}(l)$, in channel estimation. According to Equation (8), $\hat{T}_{kW}(l)$ is obtained as follows:

$$\hat{T}_{kW}(l) = \{m_{N-kW-l}, m_{N-kW-l+1}, \ldots, m_{N-2}, m_{N-1}, m_0, m_1, \ldots, m_{N-kW-2-l}, m_{N-kW-1-l}\}. \qquad \text{Equation (9)}$$

Further the following Equation (10) is established:

$$\hat{T}_{kW}(l) = M_{kW+l}. \qquad \text{Equation (10)}$$

Figure 2:
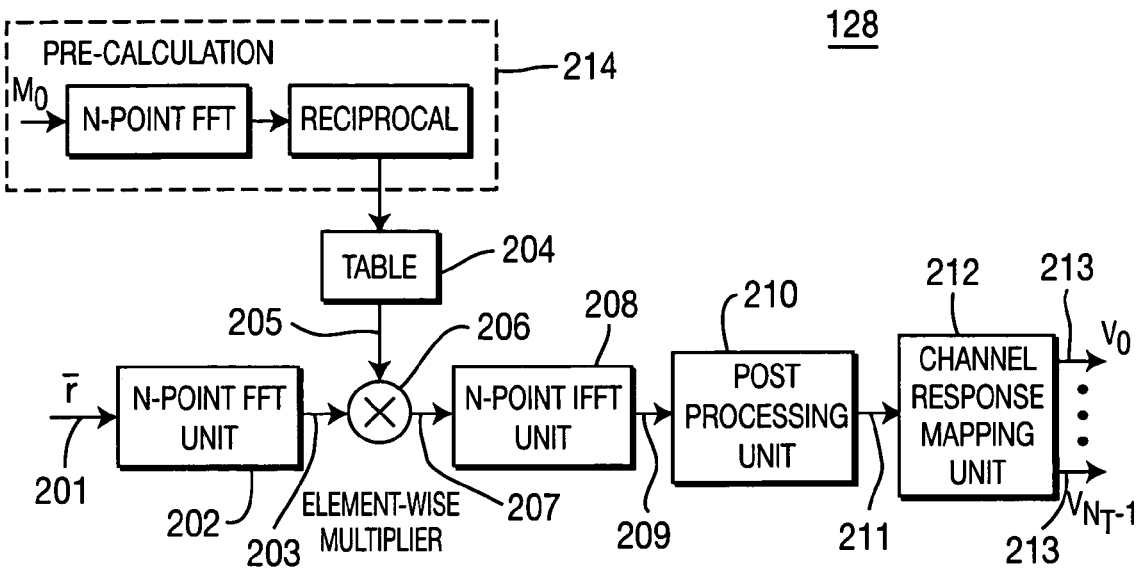
FIG. 2 is a block diagram of a channel estimator in accordance with the present invention.

Channel estimation in accordance with the present invention is set forth hereinafter. Referring to FIG. 2, a block diagram of a channel estimator 128 in accordance with the present invention is shown. The channel estimator 128 comprises an FFT unit 202, a table 204, a multiplier 206, an IFFT unit 208, a post processing unit 210 and a channel response mapping unit 212. The N-point FFT unit 202 receives input samples 201 and performs N-point FFT on the input samples 201. The table 204 stores pre-calculated reciprocal of N-point FFT of the basic code.

The pre-calculation is represented by a dotted block 214. The dotted block 214 need not be an actual component of the channel estimator 128, but is shown in FIG. 2 for illustrating the pre-calculation and storing of the inverse of an N-point FFT of the basic code. The N-point FFT is performed on the basic code $M_0$ and the reciprocal of the N-point FFT of the basic code $M_0$ is calculated. The reciprocal is then stored in the table 204.

The output 205 of the table 204, (i.e., the stored inverse of the N-point FFT of the basic code $M_0$), is multiplied with the output 203 of the FFT unit 202 by the element-wise multiplier 206. The multiplication results 207 enter the IFFT unit 208 which performs time domain channel estimation 209. The post processing unit 210 performs a threshold test on the time domain channel estimation 209 and removes elements below the predetermined threshold. The channel response mapping unit 212 maps the processed time domain channel estimation 211 to frequency domain channel estimation 213.

The mathematical description of the generation of channel estimation is described hereinafter. The channel response between the kth transmit antenna and a receive antenna is defined as follows:

$$h_k = \{h_{k,0}, h_{k,1}, \ldots, h_{k,W-1}\}^T. \quad \text{Equation (11)}$$

Assuming a N×1 vector $\bar{r}$ represents the desired portion of the received signal for channel estimation, it can be expressed as follows:

$$\bar{r} = \hat{T} \cdot H + \bar{n}; \quad \text{Equation (12)}$$

where $\hat{T}$ is a $N \times N_T W$ matrix of the form:

$$\hat{T} = [\{\hat{T}_0(0)\}^T, \{\hat{T}_0(1)\}^T, \ldots, \{\hat{T}_0(W-1)\}^T, \quad \text{Equation (13)}$$
$$\{\hat{T}_1(0)\}^T, \{\hat{T}_1(1)\}^T, \ldots, \{\hat{T}_1(W-1)\}^T, \ldots,$$
$$\{\hat{T}_{N_T-1}(0)\}^T, \{\hat{T}_{N_T-1}(1)\}^T, \ldots,$$
$$\{\hat{T}_{N_T-1}(W-1)\}^T]$$
$$= [M_0^T, M_1^T, \ldots, M_{W-1}^T, M_W^T, M_{W+1}^T, \ldots,$$
$$M_{W+(W-1)}^T, \ldots, M_{(N_T-1)W}^T, M_{(N_T-1)W+1}^T, \ldots,$$
$$M_{(N_T-1)W+(W-1)}^T];$$

where H is a $N_T W \times 1$ vector of the form:

$$H = [h_0, h_1, \ldots, h_{N_T-1}]; \quad \text{Equation (14)}$$

and $\bar{n}$ is a N×1 noise vector of the form:

$$\bar{n} = [n_0, n_1, \ldots, n_{N-1}]^T. \quad \text{Equation (15)}$$

The matrix $\hat{T}$ is circular but not square. In order to use a more efficient algorithm in channel estimation, the matrix $\hat{T}$ is extended to a N×N circulant one. For this purpose, the vector H is extended to a N×1 vector $\bar{H}$ by padding an all-zero vector as follows:

$$Z = \{\overbrace{0, 0, \ldots, 0}^{(N-N_T W) \text{ zeros}}\}^T; \quad \text{Equation (16)}$$

where Z is an all-zero vector of length $(N-N_T W)$. The vector $\bar{H}$ is constructed as follows:

$$\bar{H} = [h_0, h_1, \ldots, h_{N_T-1}, Z]^T. \quad \text{Equation (17)}$$

The extended version $T$ of the matrix $\hat{T}$ is represented as follows:

$$T = [M_0^T, M_1^T, \ldots, M_{N-1}^T]. \quad \text{Equation (18)}$$

With respect to Equations (17) and (18), Equation (12) is re-written as follows:

$$\bar{r} = T \cdot \bar{H} + \bar{n}. \quad \text{Equation (19)}$$

Because the matrix $T$ is not only circular but also square, it can be decomposed into:

$$T = D_N^{-1} \Gamma D_N; \quad \text{Equation (20)}$$

where $D_N$ is the N-point discrete Fourier transform matrix and $\Gamma = \text{diag}(D_N(M_0))$ is a N×N diagonal matrix. Note that the matrix $T$ must be full rank, which should be guaranteed when determining the basic code $M_0$. The full-rank requirement on the matrix $T$ results in the first condition on the selection of the basic code. Then, the maximum-likelihood estimate of channel response can be expressed as follows:

$$\tilde{H} = D_N^{-1} \Gamma^{-1} D_N \bar{r} \quad \text{Equation (21)}$$
$$= \bar{H} + \bar{n}_1;$$

where $\bar{n}_1 = D_N^{-1} \Gamma^{-1} D_N \bar{n}$. Suppose $\sigma_1^2$ and $\sigma^2$ represent the variance of one element in $\bar{n}_1$ and $\bar{n}$, respectively. If $D_N(M_0) = \{\lambda_0, \lambda_1, \ldots, \lambda_{N-1}\}$, it can be shown that:

$$\sigma_1^2 = \frac{\sigma^2}{N} \sum_{i=0}^{N-1} \frac{1}{|\lambda_i|^2}; \quad \text{Equation (22)}$$

which reveals a criteria to select the basic code $M_0$. That is, in any case, the basic code $M_0$ should be chosen such that:

$$I_M = \sum_{i=0}^{N-1} \frac{1}{|\lambda_i|^2}, \quad \text{Equation (23)}$$

is minimized. Therefore, Equation (23) is the second condition on the selection of the basic code. The basic codes with $I_M < 2$ can readily be found.

Other criteria may be used in the selection of the basic code $M_0$ if the training sequences are also used for other purposes, such as synchronization, frequency offset estimation, etc. In these cases, it may be desirable to use a matched filter (MF). The training sequence and an MF may be designed jointly to minimize multiple access interference (MAI). This requirement puts further constraint on the selection of the basic code $M_0$, which will be explained in detail hereinafter.

Before using $\tilde{H}$, a threshold test on each element of $\tilde{H}$ may be performed by the post processing unit 210. With post processing, the noise-only elements in $\tilde{H}$ are set to zero. In a specific case that the threshold is set to zero, each of the consecutive length-W segments in the vector $\tilde{H}$ is assumed to be a channel response vector.

The channel response $\tilde{H}$ given by Equation (21) is in the time domain. Because OFDM systems need a channel response in the frequency domain, a mapping must be made by the channel response mapping unit 212 with respect to Equation (21). Suppose that:

$$G_P = \{1, 1, \ldots, 1\}; \quad \text{Equation (24)}$$

is a 1×P all-one vector, where P is the FFT length identical to that used in generation of OFDM symbols. Performing an inverse DFT on the vector $G_P$ results in $Q_0 = D_P^{-1}(G_P) = \{1, 0, 0, \ldots, 0\}$. It should be noted that $G_P$ can be of any known sequence of length P and letting $G_P$ be all-one vector is just for the purpose of simplicity. $Q_l$ is defined as a cyclic l-shift version of $Q_0$. For example, if:

$$Q_0 = \{1, 0, 0, \ldots, 0\}; \quad \text{Equation (24)}$$

then $$Q_1 = \{0, 1, 0, \ldots, 0\}, \quad \text{Equation (25)}$$

and so on. Suppose that the kth channel response $\tilde{h}_k = \{\tilde{h}_{k,0}, \tilde{h}_{k,1}, \ldots, \tilde{h}_{k,W-1}\}^T$ is mapped into the frequency domain. Note that, after post processing, some elements of $\tilde{h}_k$ may be zero. Then, a vector of length P is constructed as follows:

$$v_k = \sum_{l=0}^{W-1} \tilde{h}_{k,l} \cdot Q_l. \quad \text{Equation (26)}$$

Then, performing an FFT on the vector $v_k$ results in:

$$V_k = D_P(v_k) \quad \text{Equation (27)}$$
$$= \sum_{l=0}^{W-1} \tilde{h}_{k,l} \cdot D_P(Q_l);$$

which is the kth channel response in the frequency domain. Assuming $V_k = \{V_{k,0}, V_{k,1}, V_{k,P-1}\}$, the pth element $V_{k,p}$ of $V_k$ represents the channel response for the pth sub-carrier between the kth transmit antenna and a receive antenna. To implement Equation (27), the vectors $D_P(Q_l)$ are pre-calculated and stored in a memory, such as in the look-up table 204. Suppose $V_{k,p} = H_{k,p} + N_{k,p}$, where $H_{k,p}$ and $N_{k,p}$ are the desired sub-channel coefficient and noise term, respectively. It can be shown that:

$$H_{k,p} = \sum_{l=0}^{W-1} h_{k,l} W_P^{pl}; \quad \text{Equation (28)}$$

and the variance of $N_{k,p}$ is $$\sigma_2^2 = N_{path} \sigma_1^2, \quad \text{Equation (29)}$$

where $W_P = e^{-j2\pi/P}$ and $N_{path}$ is the number of non-zero elements in $\tilde{h}_k$.

The training sequences may also be used for the purposes of time and/or frequency synchronizations. Recall that each column vector in the matrix $\hat{T}$ given by Equation (13) is just a cyclic-shift version of $M_0^T$. Assuming that the impulse response of the matched filter (MF) is a 1×N vector $A_{k,l}$, an indicator with respect to the multiple access interference (MAI) level is given by $\Omega = A_{k,l} \cdot \hat{T}$. $\Omega$ is a 1×$N_T$W vector. An optimal MF, (MAI-free), implies that all the elements in the vector $\Omega$ are zero except the (kW+l)th element. For example, assuming $M_0$ be a real binary code and $A_{k,l} = M_{kW+l}$, it is very difficult to make the MF be MAI-free no matter how the basic code $M_0$ is designed (searched).

By using the properties of the M-sequence, the present invention provides an MAI-free MF at the cost of increasing the white noise power by a factor of two.

One embodiment of the present invention includes a simple MF with optimal performance by choosing $M_0$ as well as designing $A_{k,l}$ properly.

Suppose the basic code is an M-sequence. In this case, the length of the basic code N is limited to the values of $2^u - 1$, where u is an integer. The basic code (M-sequence) $M_0$ should be chosen to minimize Equation (23).

Suppose that $G_N = \{1, 1, \ldots, 1\}$ is an 1×N all-one vector. The impulse response of the optimal MF is constructed as follows:

$$A_{k,l} = M_{kW+l} + G_N. \quad \text{Equation (30)}$$

Equation (30) is optimal for the following properties of the M-sequence: (i) $M_i \cdot M_j^T = N$ if i=j, (ii) $M_i \cdot M_j^T = -1$ if i≠j, (iii) $G_N \cdot M_j^T = 1$, where i,j∈[0, 1, …, N−1]. If such a MF is used to match the desired signal, its output is represented as follows:

$$y_{k,l} = \frac{1}{N+1} A_{k,l} \cdot \bar{r} \quad \text{Equation (31)}$$
$$= h_{k,l} + \frac{1}{N+1} A_{k,l} \cdot \bar{n}.$$

Because about half of the elements in $A_{k,l}$ are zero and the rest are non-zero elements taken value of 2, the noise variance in $y_{k,l}$ is given by:

$$\sigma_{y_{k,l}}^2 = \frac{2\sigma^2}{N+1}. \quad \text{Equation (32)}$$

If the training sequences are binary sequences (e.g., M-sequences), the complexity of the synchronizations is reduced. Additionally, a moving window is needed in the synchronizations. When the window goes through a segment with an undesired signal, the MF also has outputs with large peaks. Therefore, the largest peak of moving signal-to-noise ratio should be detected at the MF output rather than the largest peak of the MF output. Because the optimal MF has improved the signal to noise ratio (MAI-free) around the desired segment of the received signal flow, it is definitely an asset in synchronizations.

Figure 3:
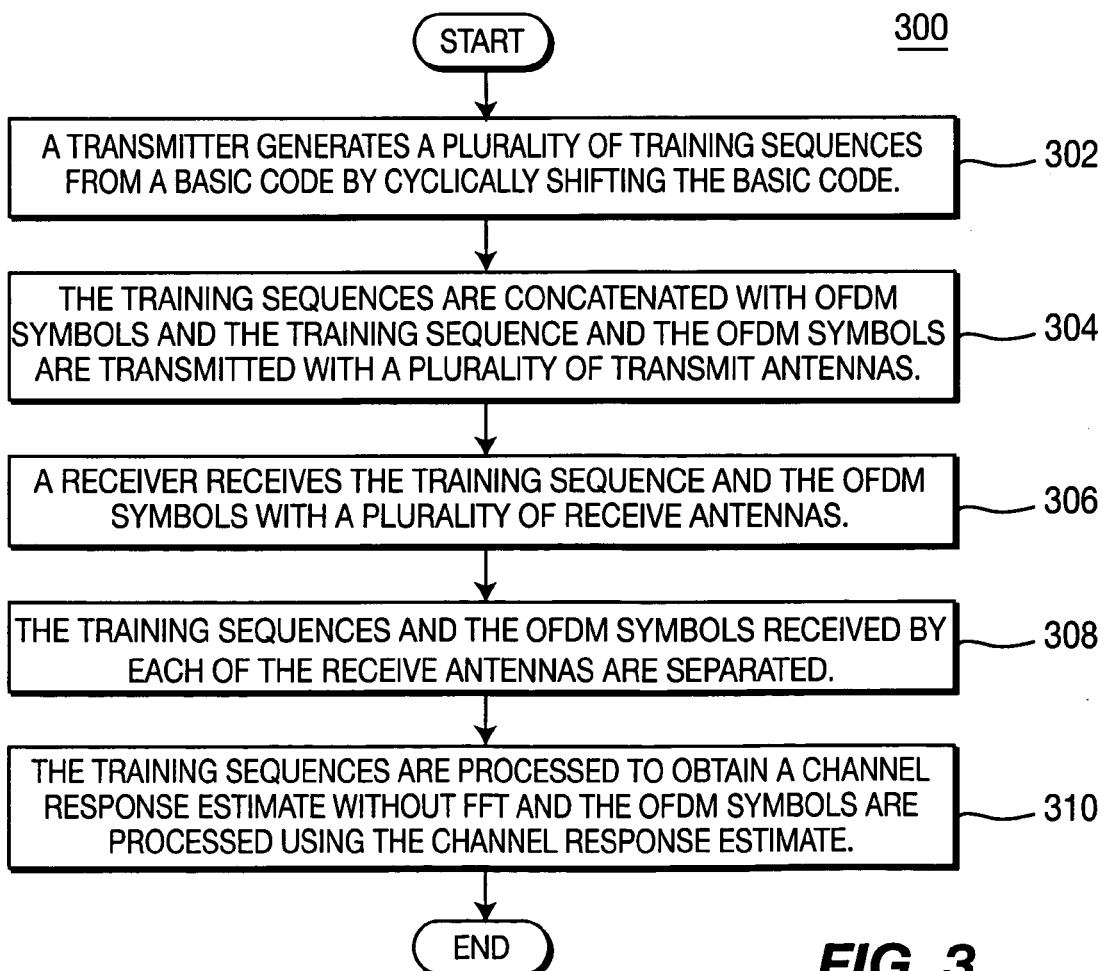
FIG. 3 is a flow diagram of a process for channel estimation and synchronization in accordance with the present invention.

FIG. 3 is a flow diagram of a process 300 for performing channel estimation and synchronization in an OFDM-MIMO wireless communication system. Both a transmitter and a receiver comprise a plurality of antennas. The transmitter generates a plurality of training sequences from a basic code by cyclically shifting the basic code (step 302). The training sequences are concatenated with OFDM symbols, and the training sequence and the OFDM symbols are transmitted with a plurality of transmit antennas (step 304). Each transmit antenna transmits a different training sequence simultaneously. The receiver receives the training sequences and the OFDM symbols with a plurality of receive antennas (step 306). The training sequence and the OFDM symbols received by each of the receive antennas are then separated (step 308). The training sequences are processed to obtain a channel response estimate and the OFDM symbols are processed using the channel response estimate (step 310).

Although the features and elements of the present invention are described in the preferred embodiments in particular combinations, each feature or element can be used alone without the other features and elements of the preferred embodiments or in various combinations with or without other features and elements of the present invention.

What is claimed is:

1. In an orthogonal frequency division multiplexing (OFDM) multiple-input multiple-output (MIMO) wireless communication system where both a transmitter and a receiver include a plurality of antennas, a method for optimizing channel estimation in the OFDM wireless communication system, the method comprising:
at the transmitter:
generating a plurality of training sequences from a basic code, $M_0$, by cyclically shifting the basic code, the length of the basic code and each shift W between two training sequences are chosen such that each shift W is greater than a maximum delay spread of a wireless communication channel;
concatenating the training sequence with OFDM symbols;
transmitting the training sequence and the OFDM symbols with a plurality of transmit antennas, each transmit antenna transmitting a different training sequence simultaneously;
at the receiver:
receiving the training sequence and the OFDM symbols with a plurality of receive antennas;
separating the training sequence and the OFDM symbols received by each of the receive antennas;
processing the training sequence to obtain a channel response estimate; and
processing the OFDM symbols using the channel response estimate.

2. The method of claim 1 wherein the last W elements of each training sequence are repeated as a cyclic prefix.

3. The method of claim 1 wherein the channel estimation is performed before fast Fourier transform (FFT) of the received signals.

4. The method of claim 1 wherein a threshold test is performed on elements of the channel response estimate, whereby a noise only element is set to zero.

5. The method of claim 1 further comprising a step of mapping the channel response estimate to a corresponding value in a frequency domain.

6. The method of claim 1 wherein the training sequence is a binary sequence in a time domain.

7. The method of claim 6 wherein the training sequence is selected so that the matrix $\overline{T}=[M_0^T, M_1^T, \ldots, M_{N-2}^T, M_{N-1}^T]$ is invertible wherein $M_i$, i=0...N-1, is a code sequence generated by cyclically shifting i times the basic code $M_0$.

8. The method of claim 6 wherein the training sequence is selected to minimize $$I_M = \sum_{i=0}^{N-1} \frac{1}{|\lambda_i|^2},$$

where N-point fast Fourier transform (FFT) of the basic code $M_0$ $D_N(M_0) = \{\lambda_0, \lambda_1, \ldots, \lambda_{N-1}\}$.

9. The method of claim 1 wherein the basic code $M_0$ is an M-sequence and the received training sequence portion is used for synchronization at the receiver.

10. The method of claim 9 wherein a matched filter is used in the receiver and an impulse response of the matched filter for the lth path of the kth channel response, $A_{k,l}$, is given by $A_{k,l} = M_{kW+l} + G_N$, wherein $M_{kW+l}$ is a code generated by cyclically shifting the basic code $M_0$ by kW+l and $G_N$ is an all one vector of length N.

11. The method of claim 10 wherein a threshold test in the synchronization is based on variables of moving signal-to-noise ratio at an output of the matched filter.

12. In an orthogonal frequency division multiplexing (OFDM) multiple-input multiple-output (MIMO) wireless communication system where both a transmitter and a receiver include a plurality of antennas, a system for optimizing channel estimation in the OFDM wireless communication system, the system comprising:
a transmitter comprising:
a training sequence generator for generating a plurality of training sequences for a plurality of transmit antennas, the training sequence being generated by cyclically shifting a basic code, $M_0$, the length of the basic code and each shift W between two training sequences are chosen such that each shift W is greater than a maximum delay spread of a wireless communication channel;
a concatenator for concatenating the training sequence and OFDM symbols; and
a plurality of transmit antennas for transmitting the training sequence and the OFDM symbols, each transmit antenna transmitting a different training sequence simultaneously; and
a receiver comprising:
a plurality of receive antennas for receiving the training sequence and the OFDM symbols;
a segment splitter for separating the training sequence and the OFDM symbols received by each of the receive antennas;
a channel estimator for processing the training sequence to obtain a channel response estimate; and
a processor for processing the OFDM symbols using the channel response estimate.

13. The system of claim 12 wherein the last W elements of each training sequence are repeated as a cyclic prefix.

14. The system of claim 12 wherein the channel estimation is performed without fast Fourier transform (FFT) of the received signals.

15. The system of claim 12 further comprising a post processing unit for performing a threshold test on elements of the channel response estimate, whereby a noise only element is set to zero.

16. The system of claim 12 further comprising a mapping unit for mapping the channel response estimate to a corresponding value in a frequency domain.

17. The system of claim 12 wherein the training sequence is a binary sequence in a time domain.

18. The system of claim 17 wherein the training sequence is selected so that the matrix $\overline{T}=[M_0^T, M_1^T, \ldots, M_{N-2}^T, M_{N-1}^T]$ is invertible, wherein $M_i$, i=0...N-1, is a code sequence generated by cyclically shifting i times the basic code $M_0$.

19. The system of claim 17 wherein the training sequence is selected to minimize $$I_M = \sum_{i=0}^{N-1} \frac{1}{|\lambda_i|^2},$$

where N-point fast Fourier transform (FFT) of the basic code $M_0$ $D_N(M_0)=\{\lambda_0, \lambda_1, \ldots, \lambda_{N-1}\}$.

20. The system of claim 12 wherein the basic code $M_0$ is an sequence and the received training sequence portion is used for synchronization at the receiver.

21. The system of claim 20 wherein a matched filter is used in the receiver and an impulse response of the matched filter for the lth path of the kth channel response, $A_{k,l}$, is given by $A_{k,l}=M_{kW+l}+G_N$, wherein $M_{kW+l}$ is a code generated by cyclically shifting the basic code $M_0$ by kW+l and $G_N$ is an all one vector of length N.

22. The system of claim 21 wherein a threshold test in the synchronization is based on variables of moving signal-to-noise ratio at an output of the matched filter.

* * * * *

UNITED STATES PATENT AND TRADEMARK OFFICE
CERTIFICATE OF CORRECTION

PATENT NO. : 7,120,201 B2
APPLICATION NO. : 11/222171
DATED : September 8, 2005
INVENTOR(S) : Huang et al.

It is certified that error appears in the above-identified patent and that said Letters Patent is hereby corrected as shown below:

IN THE SPECIFICATION

At column 4, line 4, delete Equation (5) and insert therefor

--$P_{kW} = \{m_{N-kW-W}, m_{N-kW-(W-1)}, m_{N-kW-2}, m_{N-kW-1}\}$.--.

At column 5, line 52, delete Equation (14) and insert therefor

--$H = [h_0, h_1, \ldots, h_{N_T-1}]^T$, --.

At column 5, line 55, delete Equation (15) and insert therefor

--$\overline{n} = [n_0, n_1, \ldots, n_{N-1}]^T$.--.

At column 6, line 8, delete Equation (18) and insert therefor

--$\overline{T} = [M_0^T, M_1^T, \ldots, M_{N-2}^T, M_{N-1}^T]$.--.

At column 7, line 16, after the word "Equation", delete "24" and insert therefore --25--.

At column 7, line 19, after the word "Equation", delete "25" and insert therefore --26--.

At column 7, line 27, after the word "Equation", delete "26" and insert therefore --27--.

At column 7, line 34, after the word "Equation", delete "27" and insert therefore --28--.

At column 7, line 45, after the word "Equation", delete "27" and insert therefore --28--.

UNITED STATES PATENT AND TRADEMARK OFFICE
CERTIFICATE OF CORRECTION

| | | |
|---|---|---|
| PATENT NO. | : 7,120,201 B2 | |
| APPLICATION NO. | : 11/222171 | |
| DATED | : September 8, 2005 | |
| INVENTOR(S) | : Huang et al. | |

It is certified that error appears in the above-identified patent and that said Letters Patent is hereby corrected as shown below:

At column 7, line 52, after the word "Equation", delete "28" and insert therefore --29--.

At column 7, line 59, after the word "Equation", delete "29" and insert therefore --30--.

At column 8, line 21, after the word "Equation", delete "30" and insert therefore --31--.

At column 8, line 22, after the word "Equation", delete "30" and insert therefore --31--.

At column 8, line 29, after the word "Equation", delete "31" and insert therefore --32--.

At column 8, line 40, after the word "Equation", delete "32" and insert therefore --33--.

UNITED STATES PATENT AND TRADEMARK OFFICE
CERTIFICATE OF CORRECTION

PATENT NO. : 7,120,201 B2
APPLICATION NO. : 11/222171
DATED : September 8, 2005
INVENTOR(S) : Huang et al.

It is certified that error appears in the above-identified patent and that said Letters Patent is hereby corrected as shown below:

IN THE CLAIMS

At claim 20, column 11, line 10, before the words "and the", delete "sequence" and insert therefor --M-sequence--.

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,120,201 B2
APPLICATION NO. : 11/222171
DATED : October 10, 2006
INVENTOR(S) : Huang et al.

It is certified that error appears in the above-identified patent and that said Letters Patent is hereby corrected as shown below:

IN THE SPECIFICATION

At column 4, line 4, delete Equation (5) and insert therefor

--$P_{kW} = \{m_{N-kW-W}, m_{N-kW-(W-1)}, m_{N-kW-2}, m_{N-kW-1}\}$.--.

At column 5, line 52, delete Equation (14) and insert therefor

--$H = [h_0, h_1, \ldots, h_{N_T-1}]^T$, --.

At column 5, line 55, delete Equation (15) and insert therefor

--$\overline{n} = [n_0, n_1, \ldots, n_{N-1}]^T$.--.

At column 6, line 8, delete Equation (18) and insert therefor

--$\overline{T} = [M_0^T, M_1^T, \ldots, M_{N-2}^T, M_{N-1}^T]$.--.

At column 7, line 16, after the word "Equation", delete "24" and insert therefore --25--.

At column 7, line 19, after the word "Equation", delete "25" and insert therefore --26--.

At column 7, line 27, after the word "Equation", delete "26" and insert therefore --27--.

At column 7, line 34, after the word "Equation", delete "27" and insert therefore --28--.

At column 7, line 45, after the word "Equation", delete "27" and insert therefore --28--.

UNITED STATES PATENT AND TRADEMARK OFFICE
CERTIFICATE OF CORRECTION

| | | |
|---|---|---|
| PATENT NO. | : 7,120,201 B2 | |
| APPLICATION NO. | : 11/222171 | |
| DATED | : October 10, 2006 | |
| INVENTOR(S) | : Huang et al. | |

It is certified that error appears in the above-identified patent and that said Letters Patent is hereby corrected as shown below:

At column 7, line 52, after the word "Equation", delete "28" and insert therefore --29--.

At column 7, line 59, after the word "Equation", delete "29" and insert therefore --30--.

At column 8, line 21, after the word "Equation", delete "30" and insert therefore --31--.

At column 8, line 22, after the word "Equation", delete "30" and insert therefore --31--.

At column 8, line 29, after the word "Equation", delete "31" and insert therefore --32--.

At column 8, line 40, after the word "Equation", delete "32" and insert therefore --33--.

UNITED STATES PATENT AND TRADEMARK OFFICE
CERTIFICATE OF CORRECTION

PATENT NO. : 7,120,201 B2
APPLICATION NO. : 11/222171
DATED : October 10, 2006
INVENTOR(S) : Huang et al.

It is certified that error appears in the above-identified patent and that said Letters Patent is hereby corrected as shown below:

IN THE CLAIMS

At claim 20, column 11, line 10, before the words "and the", delete "sequence" and insert therefor --M-sequence--.

This certificate supersedes the Certificate of Correction issued April 22, 2008.

Signed and Sealed this

Twenty-seventh Day of May, 2008

JON W. DUDAS
*Director of the United States Patent and Trademark Office*